(12) United States Patent
Kasanen et al.

(10) Patent No.: US 9,777,471 B2
(45) Date of Patent: Oct. 3, 2017

(54) SHELTER, A CURVED ELEMENT AND A USE OF A SHELTER

(71) Applicant: KT-Shelter Oy, Lappeenranta (FI)

(72) Inventors: Tommi Kasanen, Lappeenranta (FI); Pekka Vihonen, Iisalmi (FI)

(73) Assignee: KT-Shelter Oy, Lappeenranta (FI)

(*) Notice: Subject to any disclaimer, the term of this patent is extended or adjusted under 35 U.S.C. 154(b) by 0 days.

(21) Appl. No.: 15/036,816

(22) PCT Filed: Oct. 2, 2014

(86) PCT No.: PCT/FI2014/050748
§ 371 (c)(1),
(2) Date: May 16, 2016

(87) PCT Pub. No.: WO2015/071531
PCT Pub. Date: May 21, 2015

(65) Prior Publication Data
US 2016/0281349 A1    Sep. 29, 2016

(30) Foreign Application Priority Data

Nov. 15, 2013 (FI) .................. 20136131

(51) Int. Cl.
*E04H 5/00* (2006.01)
*E04B 1/343* (2006.01)
(Continued)

(52) U.S. Cl.
CPC ............ *E04B 1/34305* (2013.01); *E04B 1/32* (2013.01); *E04B 1/34331* (2013.01);
(Continued)

(58) Field of Classification Search
CPC .... E04B 1/34305; E04B 1/34336; E04B 1/32; E04B 1/34384; E04B 1/34331; E04H 3/14
See application file for complete search history.

(56) References Cited

U.S. PATENT DOCUMENTS 2,328,197 A    8/1943    Cowin
4,070,846 A    1/1978    Sohlberg
(Continued)

FOREIGN PATENT DOCUMENTS

FI       52378         5/1977
FR    2821635 A1    9/2002
(Continued)

OTHER PUBLICATIONS

Office action of the priority application dated Jul. 17, 2014, Finns Patent and Registration Office.
(Continued)

*Primary Examiner* — Patrick J Maestri
(74) *Attorney, Agent, or Firm* — Berggren, Inc.

(57) ABSTRACT

Disclosed is a shelter having a base having base buses; a frame having curves and beams supporting the curves. Each end of the curves are attached to corresponding base bus; each curve is composed of curved elements, the curved element has means for connecting a curve to another curve with a beam. The shelter further has a cable, which cable is for tightening and supporting the frame. Additionally, there is a curved element, and a use of a shelter as a shelter for aircrafts or as a sports hall.

8 Claims, 11 Drawing Sheets

(51) Int. Cl.
   *E04H 6/44* (2006.01)
   *E04C 3/40* (2006.01)
   *E04H 9/16* (2006.01)
   *E04H 15/18* (2006.01)
   *E04H 15/38* (2006.01)
   *E04B 1/32* (2006.01)
   *E04H 3/10* (2006.01)
   *E04H 3/14* (2006.01)
   *E04H 9/04* (2006.01)

(52) U.S. Cl.
   CPC ...... *E04B 1/34336* (2013.01); *E04B 1/34384* (2013.01); *E04C 3/40* (2013.01); *E04H 3/10* (2013.01); *E04H 3/14* (2013.01); *E04H 6/44* (2013.01); *E04H 9/04* (2013.01); *E04H 9/16* (2013.01); *E04H 15/18* (2013.01); *E04H 15/38* (2013.01); *E04B 2001/3235* (2013.01); *E04B 2001/3252* (2013.01)

(56) References Cited

U.S. PATENT DOCUMENTS 5,269,106 A * 12/1993 Stafford .................. E04B 7/022
　　　　　　　　　　　　　　　　　　　　　135/122
5,335,684 A *  8/1994 Hanninen ............. E04H 15/505
　　　　　　　　　　　　　　　　　　　　　135/115
2008/0006315 A1    1/2008 Raniere

FOREIGN PATENT DOCUMENTS

| WO | 9922099 A1 | 5/1999 |
| WO | 2010104396 A1 | 9/2010 |
| WO | 2011131960 A2 | 10/2011 |
| WO | 2013062660 A1 | 5/2013 |

OTHER PUBLICATIONS

Canadian Intellectual Property Office Office action dated May 30, 2016 of Canadian Patent Application No. 2,929,913.

* cited by examiner

SHELTER, A CURVED ELEMENT AND A USE OF A SHELTER

TECHNICAL FIELD

This invention relates to shelters. In particular, the present invention relates to collapsible and transportable shelter construction. In addition, the present invention relates to a curved element and a use of a shelter.

BACKGROUND

Shelters are used for different purposes and in different places. For example, shelters are used for covering vehicles, for sheltering people, for giving protection against weather etc. Shelters that are used for covering massive vehicles, such as aircrafts, are typically built by using cranes. Because of this, such shelters needs to be built to places where cranes can operate. There are also air tillable shelters, however, such an arrangement is limited to a certain size and may suffer from heavy wind.

There is a need for a shelter which is easy and quickly to assemble without cranes but which is also compactly transportable.

SUMMARY

Now there has been invented an improved shelter construction, by which is addressed to above need. Various aspects of the invention include a shelter and a curved element and different uses of the shelter, which are characterized by what is stated in the independent claims. Various embodiments of the invention are disclosed in the dependent claims.

According to a first aspect, there is provided a shelter comprising a base comprising base buses; a frame comprising curves and beams supporting said curves, wherein each end of said curves are attached to corresponding base bus; wherein each curve is being composed of curved elements, said curved element comprising means for connecting a curve to another curve with a beam, wherein each beam is connected to another beam, wherein the shelter further comprises a cable, which cable for tightening and supporting the frame.

According to an embodiment, the curved element comprises a bar on both side of the curve element, which bar is for connecting a curve to another curve by means of a beam.

According to an embodiment, the curved element is perforated, which perforation is utilized for connecting a curve to another curve by means of a beam.

According to an embodiment, each beam is connected to another beam by means of the cable.

According to an embodiment, beams between two curves belong to a chain of beams, wherein said chain of beams further comprises cables between two beams.

According to an embodiment, each curved element comprises at least one fastening groove pair.

According to an embodiment, the shelter further comprises a roofing made of slides, each slide being configured to be slid between two curves through the fastening grooves of the curved elements.

According to an embodiment, the shelter further comprises a roofing made of slides, where each slide is fixed to a plurality of beams in order to be placed between two curves together with the beams.

According to an embodiment, the shelter further comprises a connection hinge at each end of the curve to connect said curve to the base bus.

According to an embodiment, the connection hinge has an active position and an inactive position, so that the curve is in upraised position when the connection hinge is in the active position, and the curve is on the ground, when the connection hinge is in the inactive position.

According to an embodiment, the connection hinge is connected to the base bus from its other end by means of shaft to enable to change from inactive position to active position.

According to an embodiment, the shelter further comprises internal covering made of slides, each internal cover slide being configured to be slid between two curves through the internal fastening grooves of the curved elements.

According to an embodiment, the internal covering is selected to have protective features, such as heat insulating features, ballistic features, aramid features.

According to a second aspect, there is provided a curved element, said curved element comprising means for connecting a curve comprising said curved element to another curved element of another curve by means of a beam, and wherein said curved element is further connectable to another curved element in order to create a curve.

According to an embodiment, the curved element comprises a bar on both side of said curved element, which bar is utilized as means for connecting a curve (to another curve by means of a beam.

According to an embodiment, the curved element is perforated which perforation is utilized as means for connecting a curve to another curve by means of a beam.

According to an embodiment, the curved element is used in a frame of a shelter.

According to a third aspect, there is provided a use of a shelter as an aircraft shelter.

According to a fourth aspect, there is provided a use of a shelter as a sports hall or sports tunnel.

DESCRIPTION OF THE DRAWINGS

In the following, various embodiments of the invention will be described in more detail with reference to the appended drawings, in which

FIG. 11a, b illustrate an embodiment of chain of beams.

DESCRIPTION OF EXAMPLE EMBODIMENTS

In the following, several embodiments of the invention will be described in the context of transportable shelters for aircrafts. It is to be noted, however, that the invention is not limited to such shelters. In fact, the different embodiments—as will be described at the end of the disclosure—have applications in any environment where shelter or an arch construction is required.

Figure 1:
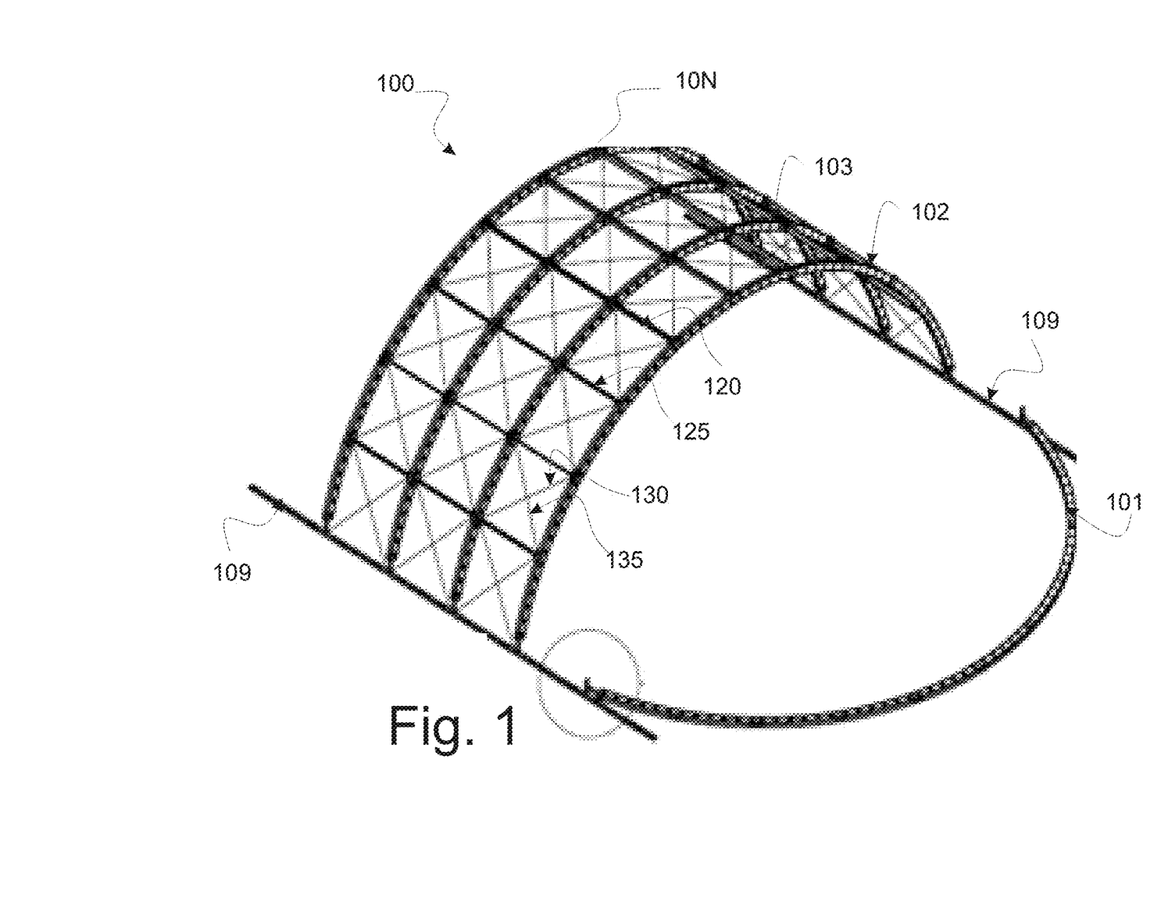
FIG. 1 shows an example of a body of a shelter in a construction stage.
Figure 2A:
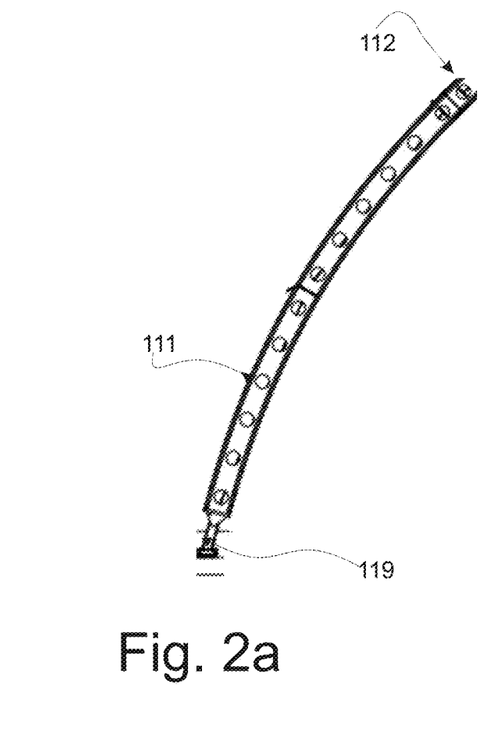
FIG. 2a shows an example of a curve having two curved elements.

FIG. 1 illustrates a shelter according to an embodiment in a construction stage. A shelter frame 100 comprises curves 101, 102, . . . , 10N and a base buses 109. The curves 101, 102, . . . , 10N are composed of curved elements 111, 112 shown in FIG. 2a and FIG. 3. Each curved element 113 (FIG. 2b), may comprise a bar 110 on each corner of the curved element's profile (cross-section A-A), which bar 110 is utilized for connecting a curve 101 to another curve 102 by means of a beam 120, 125 (FIG. 1). Both ends of the curves are provided with a connecting hinge (FIG. 2a: 119) which is configured to connect the curve to the base bus. The beams are connected to each other by means of a cable 130, 135. The cable is used for tightening and supporting the frame 100.

Figure 2B:
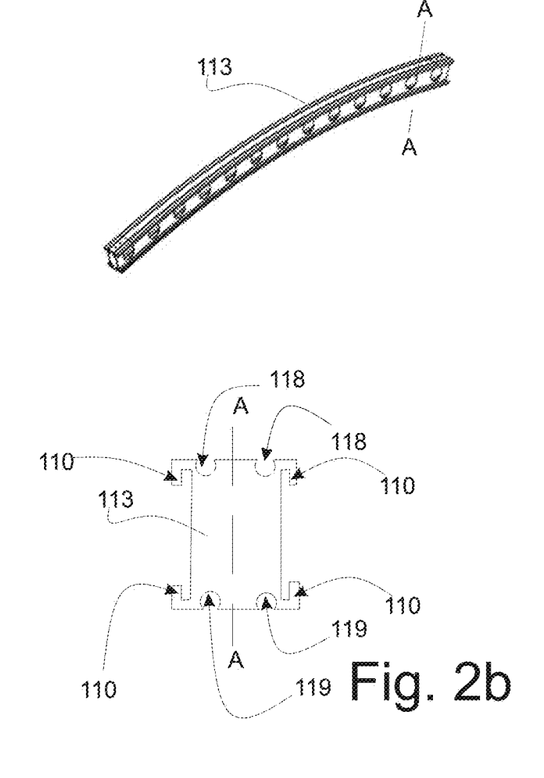
FIG. 2b shows an example of a curved element and a cross-section of the same.
Figure 3:
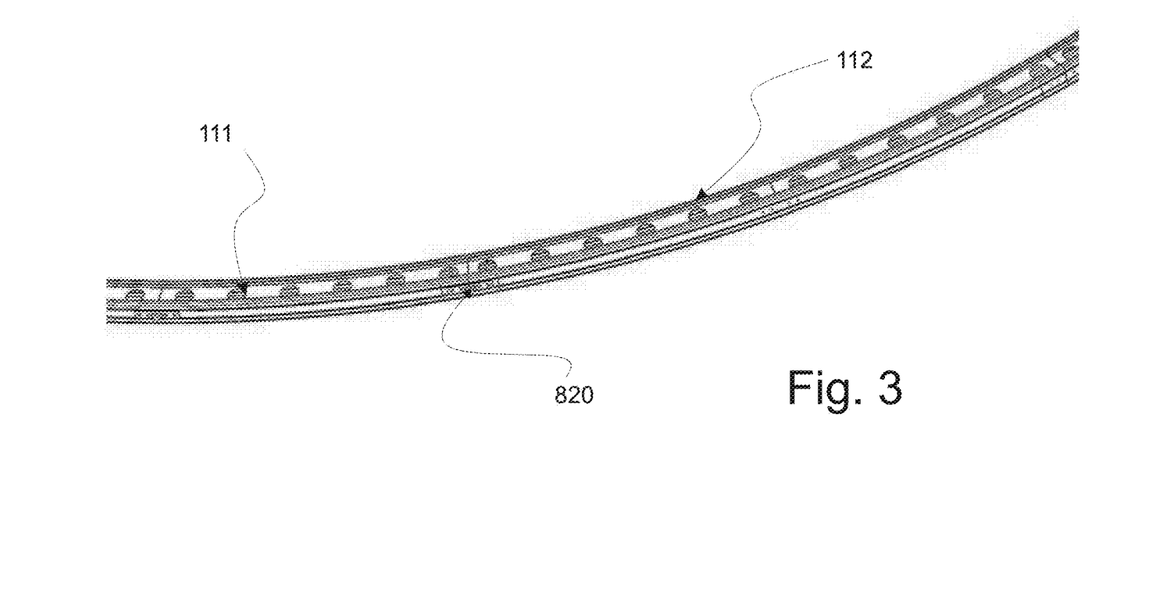
FIG. 3 shows an example of connection of two curved elements.

As shown in FIG. 2b, the curved element may have a perforated profile. This kind of profile lightens the curved element. In addition, in another embodiment, the holes can be used by the beams. In such a situation, the bars are not needed in the curved element for sliding the beams, but the beams are arranged within the holes of curves being connected. It is appreciated that in such situation, a (long) beam may extend to cover all the curves, or there can be plurality of shorter beams connecting a pair of curves. In such a latter embodiment, the beams are not slid between the curves, but may be prearranged on the curve or curved element.

The elements of the frame 100, i.e. base buses 109, curved elements 111, 112, beams 120, 125 and connecting hinges 119 may be made of aluminum. Other materials can be used as well, for example composites, steel.

When constructing the shelter, the curved elements 111, 112 are connected together (FIG. 3) in order to create a curve. According to an embodiment, each curved element is the same, whereby five curved elements are needed to make one curve. According to another embodiment, four curved elements may be sufficient for one curve. The curved elements are connected with e.g. two or more bolts 820. It is appreciated that different connection methods may be utilized. A connection hinge (FIG. 4b) is attached to both ends of the complete curve. By means of the connection hinges, the curves can be attached to the base. The connection hinge comprises a plate 410 for connecting the connection hinge to the curve. The connection hinge also comprises a foot 420 by means of which the connection hinge is connected to the base bus. In addition, the connection hinge may contain a loop 430 or other connection means for fixing the supporting cable 130, 135.

Figure 5:
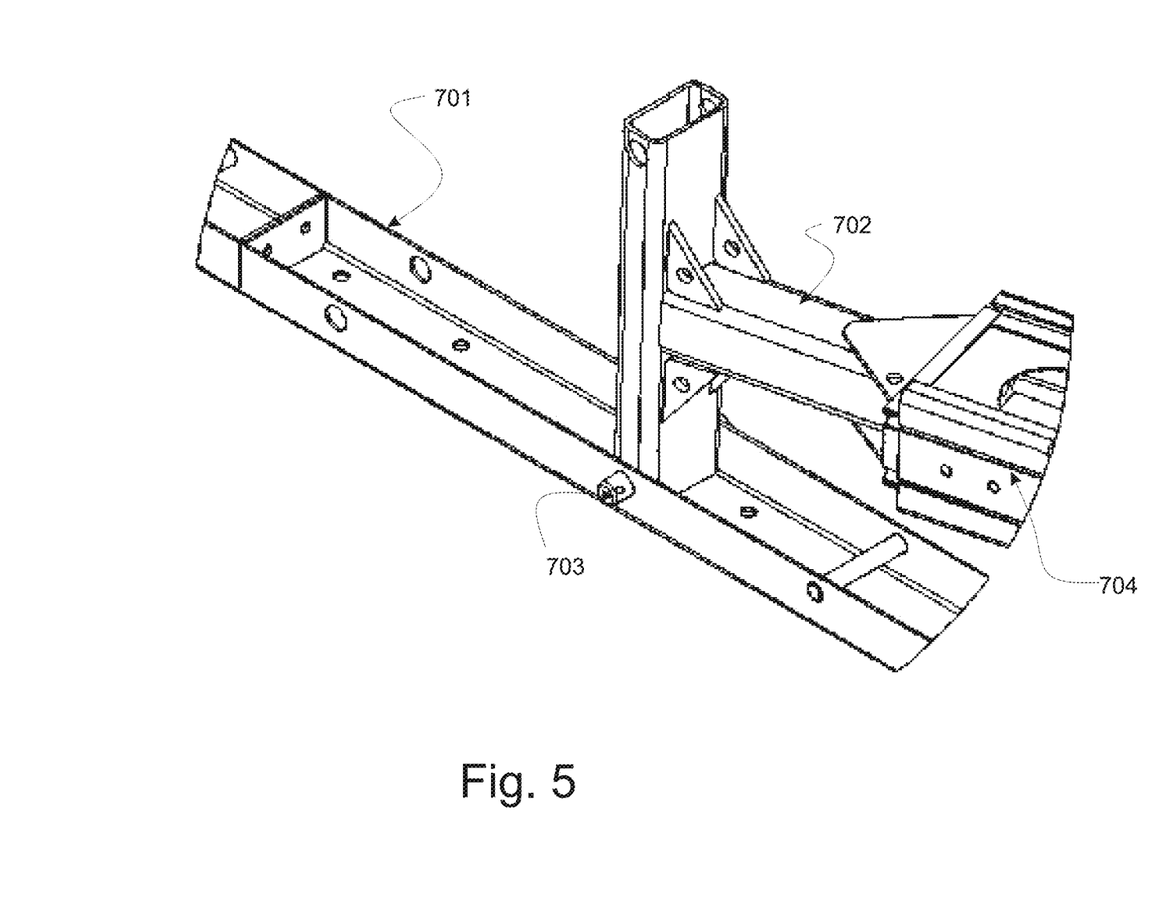
FIG. 5 shows an example of a base bus and connection hinge for connecting a curve to the base bus.

In order to create the base, the base bus elements 701 (FIG. 5) are set on the ground and connected to each other. The connection may be made by using bolts or any other suitable fixing means. In certain situations, the buses may not be connected to each other, but are separated. In yet further embodiment, the base bus is one element and not composed of plurality of base bus elements. After the base is set, the curves 704 are placed to the base bus 701 by means of the respective connection hinges 702 and a shaft 703. The shaft 703 can be locked with a cotter. It is appreciated that in this stage of the construction, the curves are lain on the ground.

Figure 6:
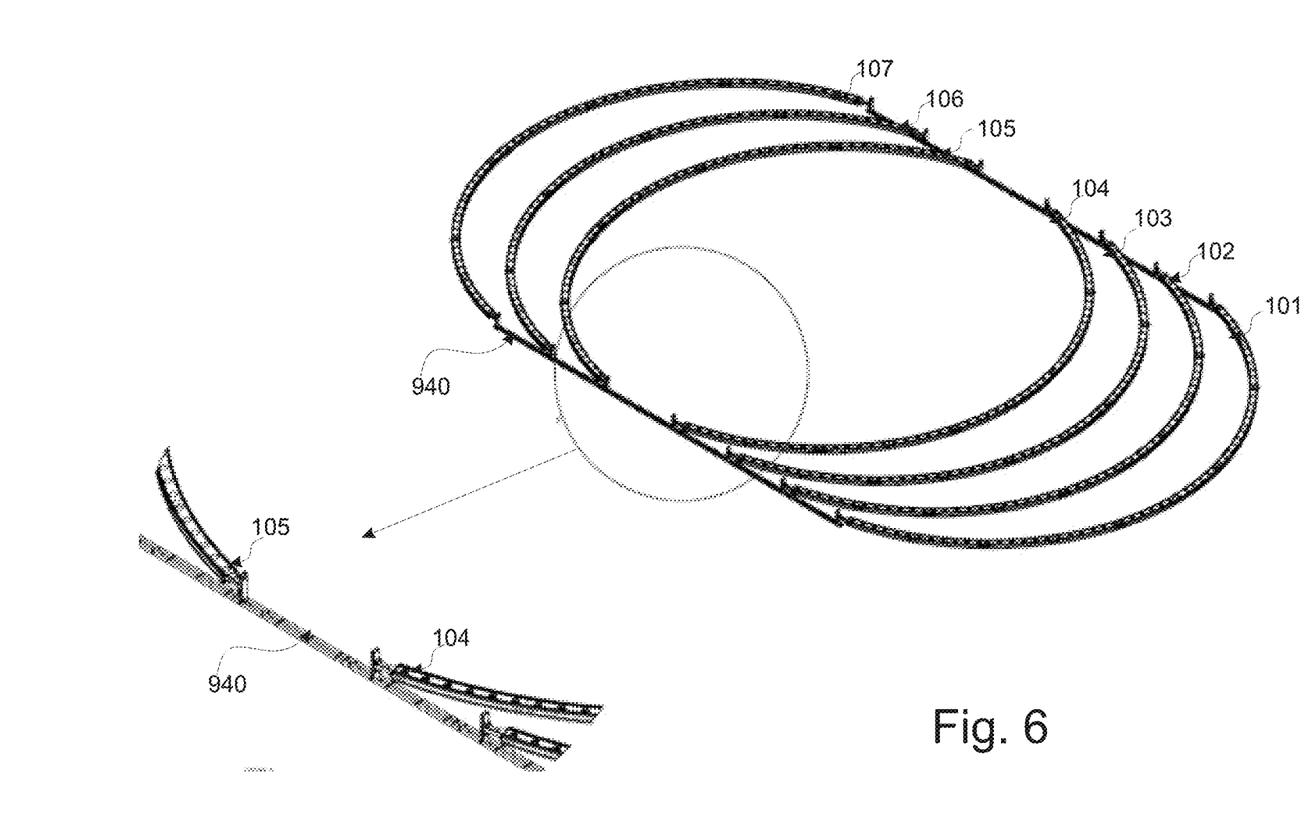
FIG. 6 shows an example of setout of the construction of the shelter.

FIG. 6 illustrates an example, where all the needed curves (101-107) have been attached to the base 940. In this example, the shelter has seven curves, each having five curved elements.

Figure 4A:
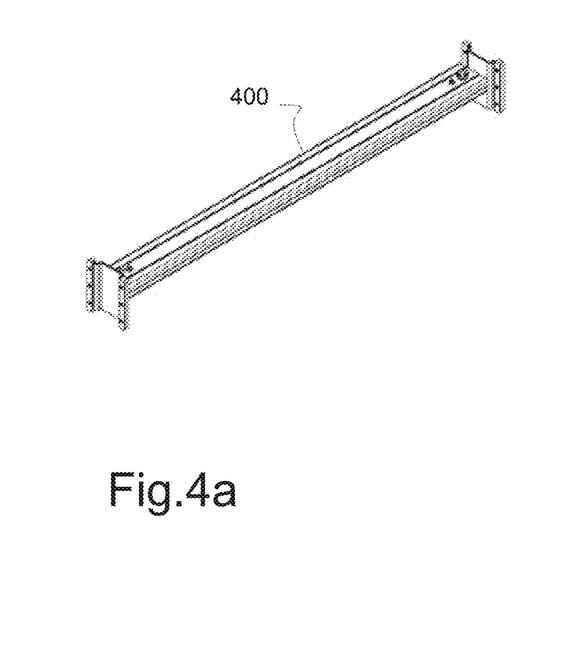
FIG. 4a shows an example of a beam.
Figure 4B:
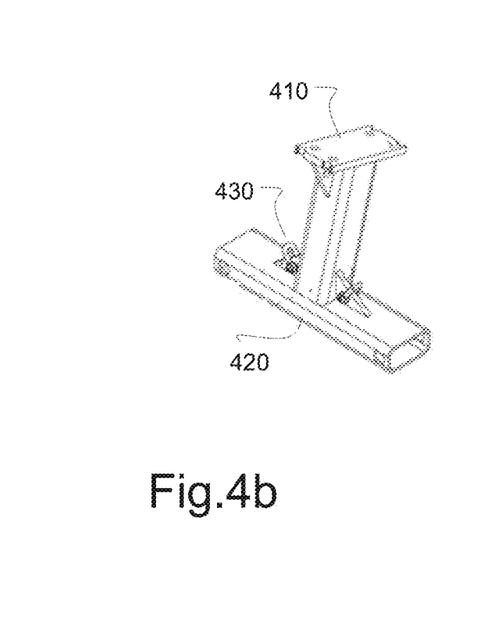
FIG. 4b shows an example of a connection hinge.
Figure 7A:
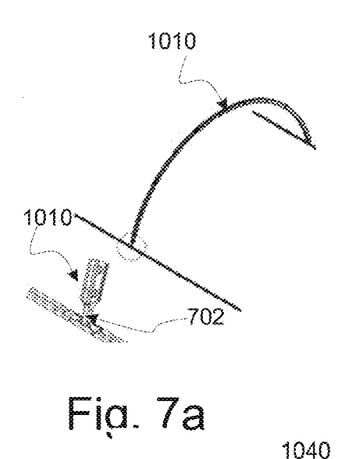
FIGS. 7a-e show examples of the process of constructing the shelter.
Figure 7B:
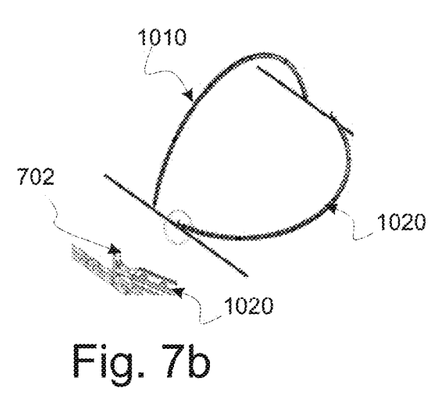
Figure 7C:
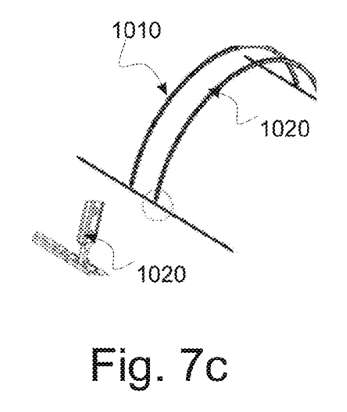
Figure 7D:
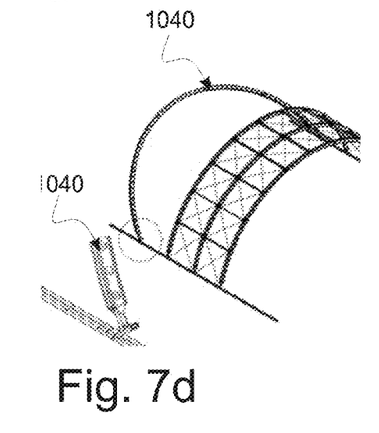
Figure 7E:
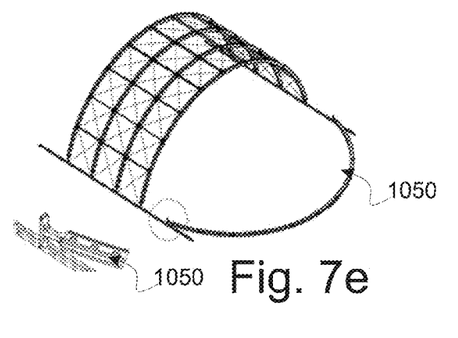
Figure 8:
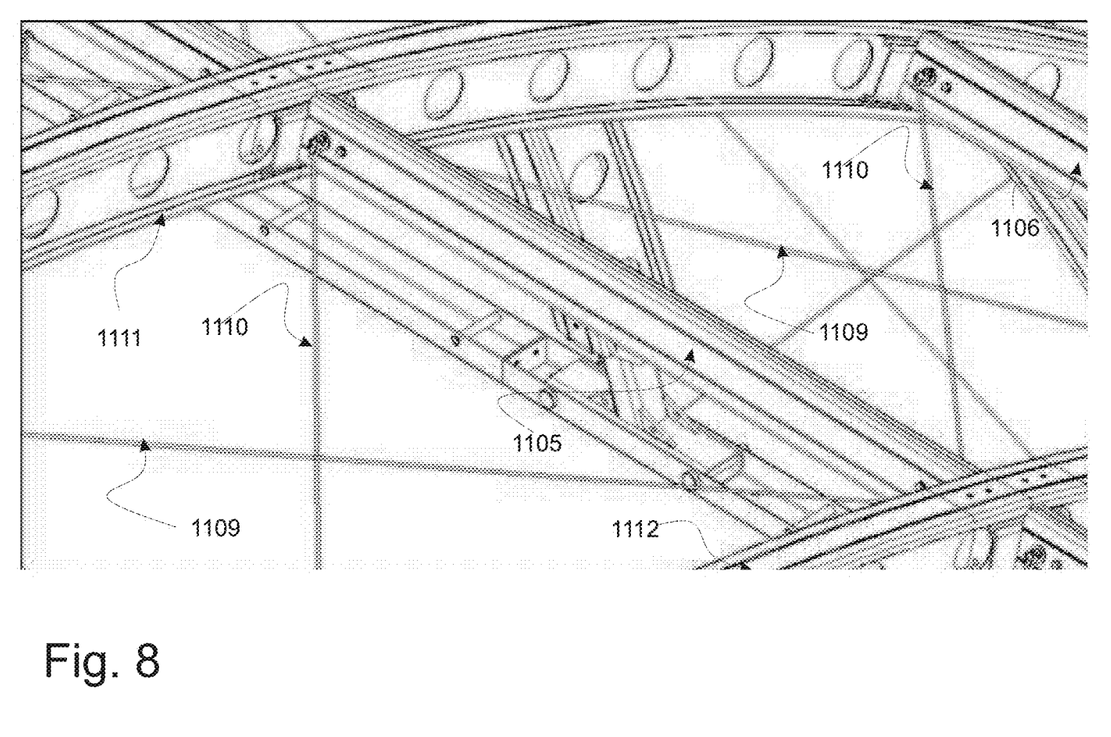
FIG. 8 shows an example of fixing the curves with beams and cables.

In order to create the frame for the shelter, the curves may be upraised one by one. This procedure is illustrated in FIG. 7. At first (FIG. 7a), the curve 1010 in the middle is upraised and fixed to the base bus (see FIG. 5) by means of the connection hinge 702. The connection hinges 702 on both ends of the curve are locked to the base buses by cotter pins. That will prevent the curve from bending over and keeps the curve straight. FIG. 7a shows an active position of the connection hinge 702, when the curve is upraised. In FIG. 7b, another curve 1020 (on the opposite of the first curve 1010) is ready for upraising. The other curve 1020 is still on the ground, and the connection hinge 702 is in its inactive position. Then (FIG. 7c) said another curve 1020 upraised and fixed as the first curve 1010. These curves 1010, 1020 are connected to each other by beams. An example of a beam 400 is illustrated in FIG. 4a. According to an embodiment, the beam is slid through the adjacent bars of the neighboring curves (FIG. 8). In this example, there are nine beams between the curves. According to another embodiment, the beams are placed between two curves and into holes of two perforated curved elements. In addition, two cables may be diagonally conveyed through the beams (FIG. 8). The two cables may diagonally extend through each beam between two curves, or there can be two cables in each gap of beams. However, in such a situation, these two cables are to be connected to two other cables in the following gap in order to have a continuous supporting cable. Yet in further embodiment, the supporting cables may diagonally support the shelter frame by covering more than one gap between the curves.

Let us return to the example of FIG. 7. Now the two curves are supported to each other by means of beams and cables. This operation is continued (FIG. 7d, 7e), until all the curves have been upraised and locked to the base buses. In the previous process, after one curve has been upraised, said curve is connected to the neighboring curve by means of beams. It is appreciated that this kind of a upraising does not require any cranes, but can even be performed by men and possibly with a jigger or a pull rope.

In the previous example, the curves were upraised one after one. It is also possible, that when the first curve is upraised, this first curve is utilized (e.g. with a winch) when upraising the following curves. It is also possible, that the curves are connected to each other, e.g. by a rope, and all the curves are upraised simultaneously (after which the beams are placed). It is also possible that the curves are upraised in groups, e.g. first three curves at first, and then the rest.

FIG. 8 illustrates is a more detailed illustration of the connection of the curves 1111, 1112 by means of beams 1105, 1106 and the connection of the beams 1105, 1106 by means of the cables 1109, 1110. Such an arrangement is found between any curves in the shelter construction. In FIG. 8, there a two cables 1109, 1110 traveling through beams. However, as said above, the gap between beams may contain two cables 1109, 1110, and the following gap between beams may contain two different cables being connected to the cables 1109, 1110.

Figures 11A, 11B:
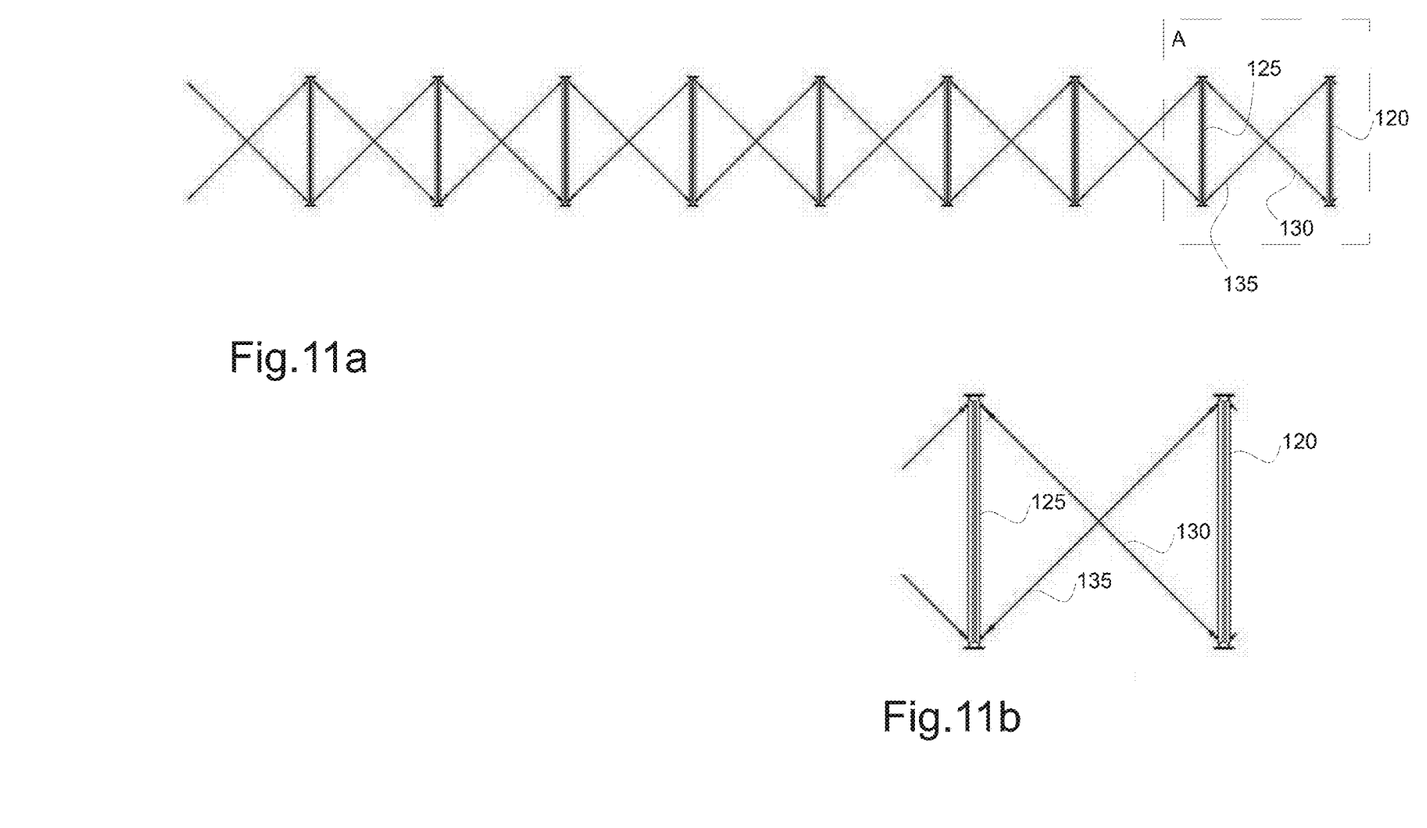

FIG. 11a illustrates an example of chain of beams. The chain of beams is preconstructed of alternating beams 120, 125, and cables 130, 135 between two beams. The amount of beams 120, 125 in the chain may vary. FIG. 11b illustrates the content of rectangle A of FIG. 11a in more detailed manner, i.e. two beams 120, 125 and cables 130, 135. A cable 130, 135 may be a continuous cable traveling through each beam in the chain, or there may be one pair of cables 130, 135 between each two beams. Compared to separate beams and cables, the preconstructed chain of beams is easy to place between two curves. The beams are slid through the adjacent bars of the neighboring curves (see also FIG. 8), and the cables will follow the sliding beams. It is appreciated that by this the upraising of the shelter is even easier, faster and simpler than before. As shown by FIGS. 7a-7e, after two curves have been upraised, the chain of beams is placed between the two curves by sliding the chain through the curves. After the next curve has been upraised, the next chain of beams is slid between the newly upraised curve and the neighboring curve.

The curves that form the frame for the shelter may each have one or more connection points for guying. The guy-wires used for guying the shelter, may be connected to the base buses, to the connection hinges or any supporting element (concrete anchor weights, sandbags and/or containers).

After the frame (i.e. curves, beams and diagonal cables) has been constructed, the roofing can be placed to the shelter frame. The complete roofing can consist of roof slides having width substantially equal to the distance between two curves. For example, the roof slides may be a PVC roof slides (Poly(vinyl) chloride) which has a Keder™ type of edging. The edging of the roof slide is slid through a fastening groove 118 (see FIG. 2b) of the curve to make an external roofing. In addition, an internal covering or additional elements (light system, heat insulating system, curtains, ballistic protective sheeting) can be installed by using inner fastening groove 119 of the curves.

In the above embodiment, the roof slides are independently slid through fastening grooves of the curved element. However, according to an embodiment, the roof slides are slid together with the beams. In such an embodiment, the roof slides comprises the needed amount of beams, and when the beams are slid between the curves, the roof slide is slide simultaneously. This embodiment can be applied both to external roofing and internal covering.

Few examples of optional elements for the shelter are given next. Double roofing (external roofing and internal covering) improves the heat insulation. If the internal covering is selected to be aramid fabric, then the protective nature of the shelter will improve. In addition, ballistic panels can be placed in the shelter to protect people and vehicles from splinters. Yet further systems can be added to the shelter, e.g. generators, motors, sensors, heating and lighting systems etc. In addition the roofing can be two-sided colored camouflage according to summer/urban environment. In addition, the curved element has such a form that it can be utilized for enclosing electric wires or used as ventilation pipe.

Figure 9:
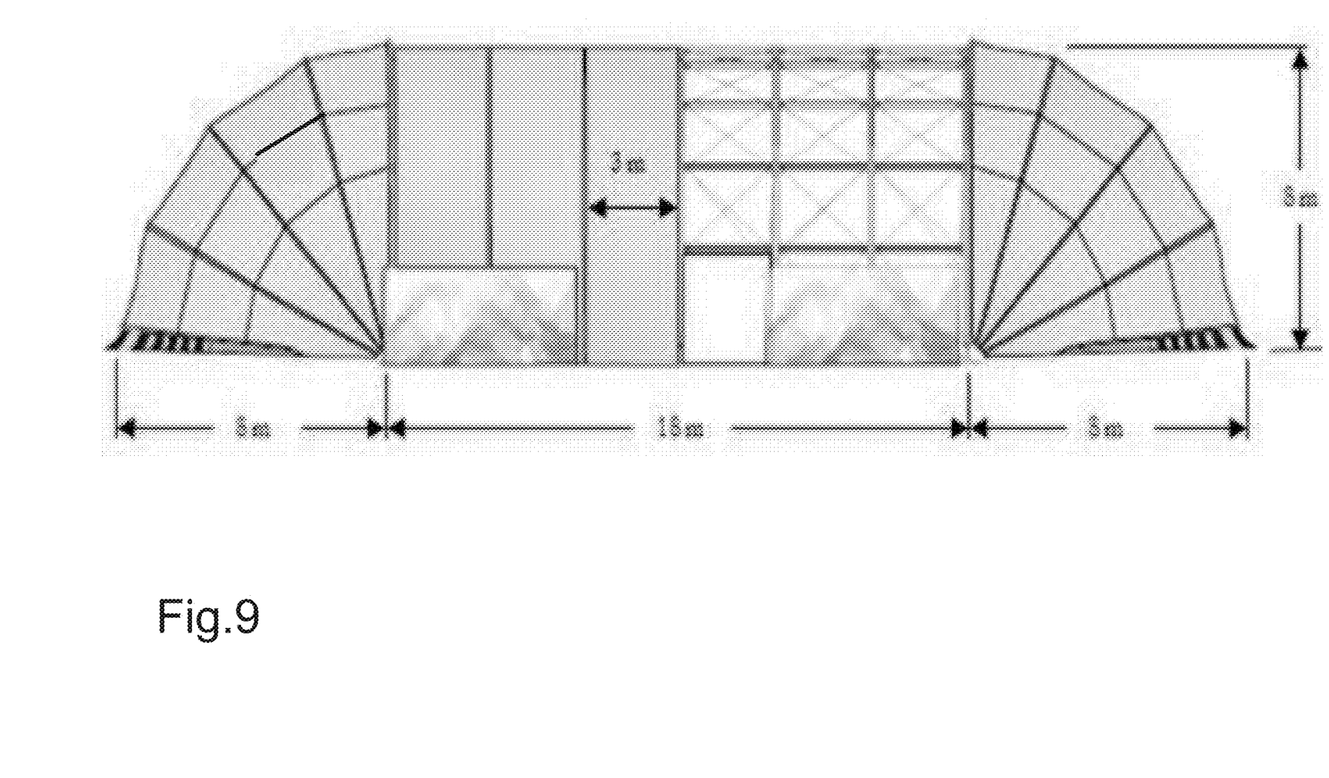
FIG. 9 shows an example of a shelter.

A shelter according to an embodiment is illustrated in FIG. 9. This shelter is made of seven curves and two quadrant-like openings. The distances between two curves in this example is three meters. The height of the shelter is in this example eight meters. It is realized that this kind of a shelter is suitable for aircrafts of different types. The measures shown in the FIG. 9 are given for example of a certain shelter. However depending on the use case, and as will be presented below, the measures may greatly deviate from what has been given here.

The shelter has a structure, that makes it possible to construct to places having different geographies, different wind and weather conditions. Such an shelter can be used not only for sheltering aircrafts, choppers, but also as a temporal shelters for people in disaster.

Figure 10A:
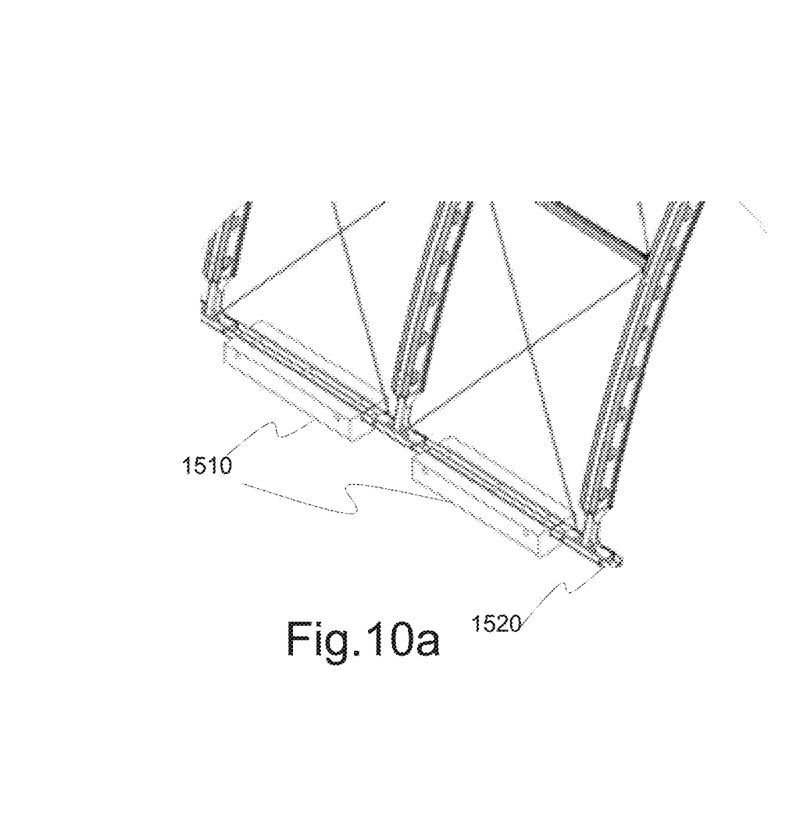
FIG. 10a, b illustrate examples of supporting the shelter by means of concrete anchor weights.
Figure 10B:
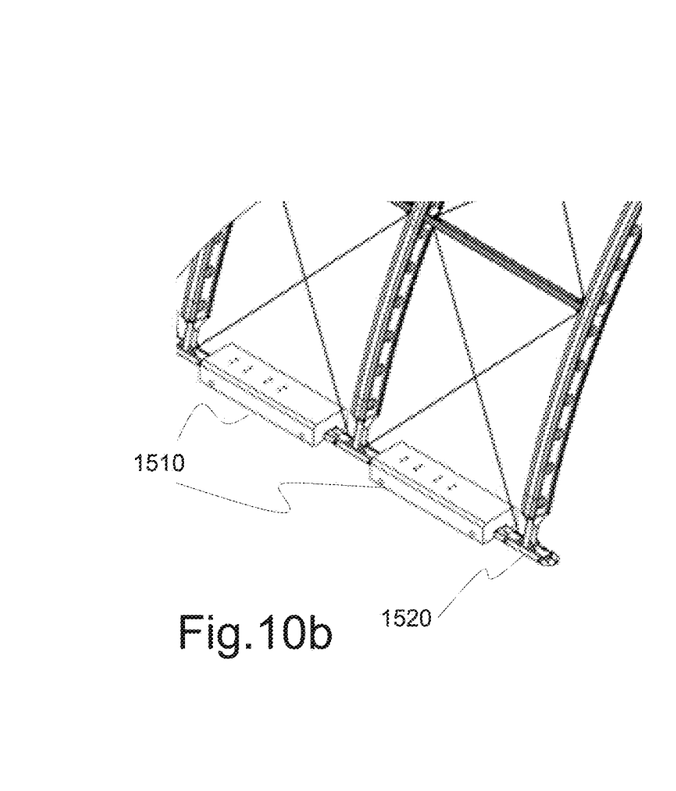

For founding the shelter to the ground, the shelter may comprise an anchoring system. The anchoring system according to an embodiment comprises concrete weight elements, support rods and guy-wires. The support rods may be made of steel. The base buses are anchored on the ground with the concrete anchor weights or sandbags and/or containers or ground anchors if ground anchors can be bolted to the ground. The concrete anchor weights 1510 can support the base buses 1520 either below (FIG. 10a) or above (FIG. 10b). The support from below (FIG. 10a) is useful, when the shelter is founded on a concrete or asphalt. On the other hand, the support from above (FIG. 10b) is useful, when the shelter is founded on a soil. It is appreciated that the support can vary on anchor weights so that between two above supports there is one below support. This kind of a solution enables smoothing the height differences.

The support rods can be attached to a supporting transport container to give support in a situation (e.g. heavy snow) where pressure towards the shelter is coming from above.

If sandbags are used for supporting the shelter frame, then guy-wires are attached to the sandbags, and fixed tightly to the connection points of the curves. It is appreciated that the shelter can be supported by the concrete anchor weights and by the sandbags simultaneously. Yet further support can be provided by containers which are placed around the shelter.

The shelter can be provided with quadrant-like opening system (as shown in FIG. 9), or straight door, at least at one end of the shelter. At least said one end of the shelter can be opened completely for entering or exiting e.g. the aircraft to/from the shelter. The quadrant-like opening system is beneficial e.g. against heavy wind.

The shelter can be connected to another shelter at one or both ends. In addition, the shelter can be attached to different containers or housing arrangements with connecting sleeves or similar connection elements.

The elements of the shelter can be compactly transported in containers.

In the above the shelter is described by using aircraft shelter as an example. However, it is realized that reducing the sizes of the elements or amount of curved elements, the shelter can be made smaller. In addition, by reducing the amount of curves, the shelter can be made shorter. Similarly, by increasing the amount of curves, the shelter or the curve arrangement can made longer. Yet, in addition, by leaving the openings open, and reducing the amount of curves and sizes of the elements, the result will be an arch construction suitable to be used e.g. in theater, show, concert settings, in parties, as pavilions, as gazebos. In addition, varying the sizes and amounts of the elements the use possibilities vary from green houses to airhalls for different sports, e.g. football, tennis, etc. In addition, ski tunnels can be easily constructed by using the teaching of the present solution. In addition, field hospitals, incident rooms and storages can be made of such shelter construction.

It is obvious that the present invention is not limited solely to the above-presented embodiments, but it can be modified within the scope of the appended claims.

The invention claimed is:

1. A shelter comprising:
   a base having base buses;
   a frame having curves with ends, wherein each end of said curves is attached to a corresponding base bus by means of a connection hinge; wherein each curve is composed of more than one curved elements having corners, and wherein each curved element has a bar on each corner of the curved element's profile;
   a chain of beams having a plurality of beams, wherein each beam of said plurality of beams is connected to another beam by means of a cable;
   wherein adjacent bars of neighboring curves are configured to guide the chain of beams for connecting a curve to another curve; and
   wherein the cable is fixed to the connection hinge of each end of said curves for tightening the chain of beams between the neighboring curves.

2. The shelter according to claim 1, wherein each curved element has at least one fastening groove pair on one side of the curved element's profile.

3. The shelter according to claim 2, further comprising a roofing made of slides, each slide being configured to be slid between two curves through a fastening groove of at least one fastening groove pair of the curved elements.

4. The shelter according to claim 1, further comprising a roofing made of slides, where each slide comprises the chain of beams.

5. The shelter according to claim 1, wherein the connection hinge has two ends and is connected to the base bus from one of the ends by means of a shaft.

6. The shelter according to claim 2, further comprising an internal covering made of slides, wherein each slide of the internal cover is configured to be slid between two curves through the internal fastening grooves of the at least one fastening groove pair of the curved elements.

7. The shelter according to claim 6, wherein the internal covering has protective features.

8. The shelter according to claim 7, wherein the protective features are selected from: heat insulating features, and ballistic features.

* * * * *